United States Patent [19]

Eldredge et al.

[11] Patent Number: 4,793,589
[45] Date of Patent: Dec. 27, 1988

[54] PISTON VALVE WITH PROPORTIONAL SOLENOID CONTROLLED PILOT VALVE

[75] Inventors: David S. Eldredge, Greensboro; Dolan F. Blalock, Kernersville; John S. McSpadden, Greensboro, all of N.C.

[73] Assignee: Gilbarco Inc., Greensboro, N.C.

[21] Appl. No.: 64,203

[22] Filed: Jun. 18, 1987

[51] Int. Cl.[4] .......................... F16K 31/40; F16K 1/52
[52] U.S. Cl. .............................. 251/30.03; 251/129.08; 251/38; 251/122; 137/625.3
[58] Field of Search ................. 251/30.03, 30.04, 44, 251/38, 30.05, 900, 122, 129.08; 137/625.3

[56] References Cited

U.S. PATENT DOCUMENTS

| 1,571,396 | 2/1926 | Darrow | 251/44 |
| 2,888,233 | 5/1959 | Windsor | 251/30.03 |
| 2,994,505 | 8/1961 | Brakebill | 251/44 X |
| 3,154,285 | 10/1964 | Houle | 251/38 X |
| 3,424,427 | 1/1969 | Ruchser | 251/44 X |
| 3,667,722 | 6/1972 | Katz et al. | 251/38 X |
| 4,474,358 | 10/1984 | Bennett | 251/900 X |

FOREIGN PATENT DOCUMENTS 1021143 11/1952 France ....................... 251/30.04

Primary Examiner—Arnold Rosenthal
Attorney, Agent, or Firm—Kenneth Watov

[57] ABSTRACT

A fluid flow control valve includes a valve body including a side wall, an inlet port through a portion of the side wall, a top, a bottom, a discharge port centrally located in the bottom, and an interior chamber; a piston slideably mounted within the interior chamber, the piston having one end overlappingly opposing the concentric with the discharge port, the one end having a centrally located recessed portion; a sealing member removably secured to, located within, the concentric with the recessed portion of the one end of the piston for providing a fluid tight seal between the piston and a valve seat about the circumference of the discharge port whenever the piston is positioned for closure of the valve; a throttle rigidly attached to and concentric with a portion of the sealing member, the upper portion of the throttle proximate the piston being cylindrical and having an outside diameter approaching the inside diameter of the discharge port, the lower portion of the throttle including a plurality of scalloped regions; and a positioning member for selectively positioning the piston within the valve body, for obtaining a desired fluid flow rate.

21 Claims, 5 Drawing Sheets

PISTON VALVE WITH PROPORTIONAL SOLENOID CONTROLLED PILOT VALVE

FIELD OF THE INVENTION

The field of the invention relates generally to flow control valves, and more specifically to piston flow control valves including pilot valves operated by porportional solenoids.

BACKGROUND OF THE INVENTION

A requirement exists in the fuel dispensing industry for a positive shut-off (zero leakage), fail-shut valve providing infinitely regulated fluid control in proportion to the amplitude or magnitude of an electrical input signal. Basically, such valves are required for controlling the flow of fluid fuels between 0 and 30 gallons per minute with a maximum working pressure of 150 p.s.i. Also, it is further required that the maximum pressure drop for such a desired valve be no more than one-half the working pressure when the valve is fully opened.

Known proportional flow control valves of the prior art do not meet the previously described requirement. Such known valves generally require much higher operating pressures, have excessive pressure drops, and do not provide positive shut-off, causing such valves to fail in an open condition.

There are many examples of efforts in the prior art to provide improved electrically-operated valves. In Neff U.S. Pat. No. 3,424,426, a solenoid 40, 50 is energized for lifting a needle 36 away from a metering orifice 25, permitting fluid under pressure in chamber 28 to escape from that chamber via the metering orifice 25. This in turn causes the pressure above the diaphragm 22 to decrease relative to the fluid pressure from the other side of the diaphragm from fluid in inlet 12, thereby causing diaphragm 22 to lift up, in turn permitting fluid from inlet 12 to flow into and be discharged from the outlet 13. When the solenoid 40, 50 is operated for permitting the needle 36 to again seat in the metering orifice 25, fluid entering the upper chamber 28 via a bleed orifice 26 creates a differential pressure imbalance, forcing the diaphragm 30 to seal about the sealing surface 15, closing the valve, thereby preventing fluid from inlet 12 to flow into outlet 13. A similar type valving mechanism using a flexible diaphragm is taught in Rattan, et al U.S. Pat. No. 3,655,163. Another similarly operating diaphragm valve is disclosed in Kozell, et al U.S. Pat. No. 3,872,878, and includes the addition of a spring biased plunger 27 for providing fail-shut operation of the valve.

Stampli U.S. Pat. No. 4,351,509 also teaches the use of a spring biased solenoid plunger with a diaphragm type valve for providing fail-shut operation (also see Zukausky U.S. Pat. No. 4,500,067). Note also that this patent teaches the use of a pilot valve seat 36 for positively sealing off the pilot flow passage 34 for closed valve conditions and for causing more rapid closure of the valve from an open valve condition.

Champeon U.S. Pat. No. 3,797,526 discloses a solenoid operated cage-type valve including a pilot controlled seal. Also shown is an "O"-ring seal 25 for a piston at the valve outlet, and another "O"-ring seal 26 between the side walls of the piston and the inside walls of the piston chamber.

Catania U.S. Pat. No. 3,633,868 discloses another form of piston valve including a solenoid operated pilot valve section for controlling the movement of a main piston in opening and closing the valve. Hertfelder, et al U.S. Pat. No. No. 4,270,726 teaches a solenoid operated pilot valve for a valve arrangement that includes a piston-like valve member coupled to a diaphragm above which is located a solenoid operated pilot valve plunger.

Solenoid operated proportional valves are also known in the prior art. For example, Arnold U.S. Pat. No. 3,926,405 teaches use of a solenoid operated armature for controlling the size of the valve opening by balancing the degree of energization of the solenoid against a countering spring force of a spring having a varying spring constant, thereby producing a valve opening proportional to a variable magnetic field produced by the solenoid. In Nishimiya, et al U.S. Pat. No. 4,314,585, another electromagnetically operated proportional type valve is disclosed, which incorporates a first spring tending to bias a valve open, a second spring tending to bias the valve closed, and an electromagnetically operated solenoid energizable for opening the valve, whereby the resultant effect of the closure and opening forces of the two springs causes valve operation to be porportional to the input current to the solenoid. Lastly, Odogaki, et al U.S. Pat. No. 4,428,558 discloses a proportionally operated rotary valve including a proportional solenoid having a rotary magnet for opening and closing a rotary valve in a proportional manner.

SUMMARY OF THE INVENTION

An object of the present invention is to provide an improved piston valve.

Another object of the invention is to provide the improved piston valve with proportional flow control.

Still another object of the invention is to provide an improved piston valve having highly stable operation.

Yet another object of the invention is to provide in a proportional flow piston valve a throttle acting as a bearing for substantially eliminating piston/throttle jamming.

Another object of the invention is to provide an improved piston valve having a zero leakage piston seal.

The present invention provides an inproved proportional solenoid operated piston valve including a pilot valve portion, with the improvement comprising conical or hollowed out portions on the top of the main piston tapering downward to a control orifice, for eliminating air by forcing air from the control cavity of the pilot valve, through a central control orifice of the piston a and into a discharge port; The piston further comprising a step-reduced lower portion for optimizing or enhancing the fluid pressure upon the piston for opening the valve; a tapered disk means for retaining an "O"-ring within a groove at the bottom of the piston for ensuring a fluid tight seal against a valve seat during closed conditions of the valve; and throttle means mounted on the bottom of the piston including means for upon opening of the valve preventing a pressure spike that may cause piston jump, by forcing fluid flow to only increase in a predetermined gradually increasing flow area, avoiding high fluid velocities which create valve instability as fluid flows from an inlet port past the throttle means and out of a discharge port.

BRIEF DESCRIPTION OF THE DRAWINGS

In the drawings wherein like items are designated by the same reference designation.

DESCRIPTION OF THE PREFERRED EMBODIMENTS OF THE INVENTION

Figure 1:
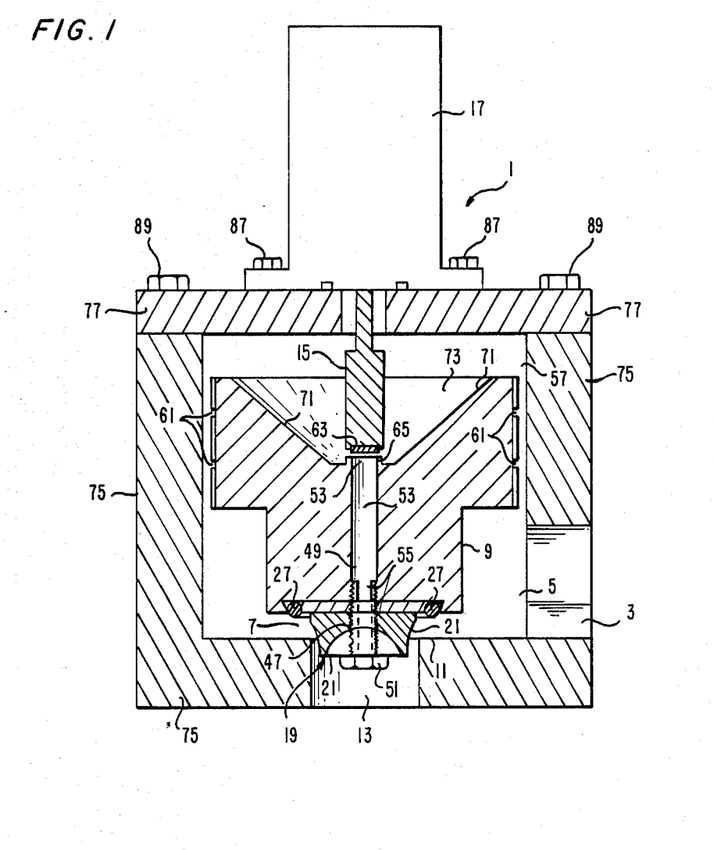
FIG. 1 is a sectional view of a preferred embodiment of the invention.

With reference to FIG. 1, as will be described, the valve system 1 regulates fluid flow in response to the magnitude or amplitude of a given electrical control signal. The rate of fluid flow in the valve 1 is in general terms controlled by the positioning of a piston 9 for varying the area for fluid flow in the flow path. A proportional solenoid 17 is responsive to the electrical control signal applied thereto for positioning the piston 9 for a desired rate of flow. A more detailed description of the operation of the present valve system 1 is given below.

Fluid enters the valve 1 through an inlet port 3, and flows into a central chamber 5. The fluid, which is assumed to be under pressure, then flows through an annular gap 7 formed by the positioning of the piston 9 relative to a valve seat 11, and exits the valve 1 through a discharge port 13. The rate of flow of the fluid is proportional to the distance between the piston 9 and the valve seat 11 at any given time. As will be described in greater detail below, this distance is variable, and is controlled by the position of the plunger 15. The plunger 15 is rigidly attached and movable by the proportional solenoid 17, with the rate of flow being controlled by varying the input power (magnitude of the control signal) applied to the solenoid 17, as previously described.

Figure 2:
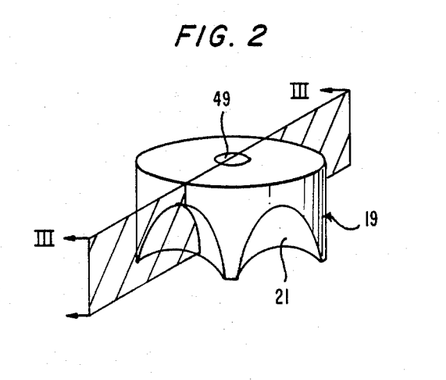
FIG. 2 is a pictorial diagram of a throttle of the preferred embodiment of the invention.
Figure 3:
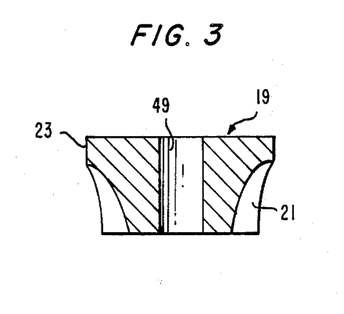
FIG. 3 is a sectional view of the throttle of FIG. 2.

As flow enters the area of discharge port 13, the fluid flows past a throttle 19. The throttle 19 is rigidly attached to the bottom of the piston 9, and has scalloped sides 21, as shown. The upper portion of the throttle 19 is cylindrical in shape, with the scalloped sides 21 being located on the lower portion thereof. A detailed pictorial view of the throttle 19 is shown in FIG. 2, and a sectional view III of throttle 19 is shown in FIG. 3. Note the upper cylindrical section 23 as shown in FIG. 3. This cylindrical portion 23 is toleranced or dimensioned relative to the inside diameter of the discharge port 13, for providing that less than 1% of the full valve flow (wide open) can pass between the throttle 19 and the bore of the discharge port 13.

The throttle 19 provides the primary regulation of flow. Assume that the valve system 1 is in the closed position, with the piston 9 in its downwardmost position, where the throttle 19 is positioned in the discharge port 13, with a primary portion of the cylindrical section 23 of throttle 19 also within the discharge port 13. An "O"-ring 27 is pushed tightly against the valve seat 11 for maintaining a fluid-tight seal, thereby preventing fluid from flowing into the discharge port 13 from the central chamber 5 and annular gap 7. The annular gap 7 is at a minimum when the valve 1 is in its closed state, as described.

The thottle 19 is the primary flow regulator. When the valve system 1 is operated to an open condition, the piston 9 moves upward causing throttle 19 to unseat or begin to move out of the discharge port 13, and the "O"-ring 27 to move away from the valve seat 11. As the valve 1 begins to so open, the tightly toleranced cylindrical section 23 of throttle 19 prevents a step-like flow of fluid or fluid rush from reaching discharge port 13. In this manner, pressure spiking which typically causes piston jump is avoided in the valve system 1. As the valve system 1 continues to be operated to a more open state, the throttle 19 continues to move upward and away from the discharge port 13, thereby exposing the scalloped portions 21 of throttle 19 to the fluid, yielding a defined and gradually increasing flow area, as shown by the arrows 29 in FIG. 4. This design feature substantially eliminates high-fluid velocities, thereby avoiding valve instability, and also providing for smooth operation of the valve on opening at an increasing rate of fluid flow as partly determined by the shape of the scalloped areas 21 of throttle 19.

Figure 5:
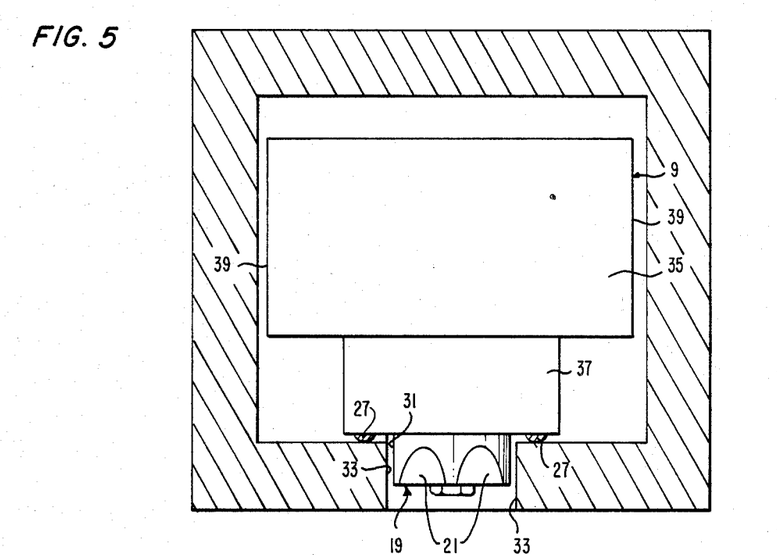
FIG. 5 is a partial sectional and cutaway view showing the piston and throttle bearing surfaces of the preferred embodiment of the invention.

Another important design feature and function of throttle 19 is that it acts as a bearing. As shown in FIG. 5, the effective bearing length for the assembly of the piston 9 and throttle 19 is measured from the top of the piston 9 to the bottom of the throttle 19. The bearing surface of the throttle 19 is provided by its overall length 31 coacting with the inside walls 33 of the discharge port 13. The throttle bearing surface 31 also effectively increases the overall bearing length to piston radius ratio, thereby substantially preventing jamming of the piston/throttle assembly 9, 19. Note that the piston 9 has an upper section 35 of substantially greater outside diameter relative to a narrower lower section 37. The upper piston section 35 provides bearing surfaces 39, as shown.

Figure 4:
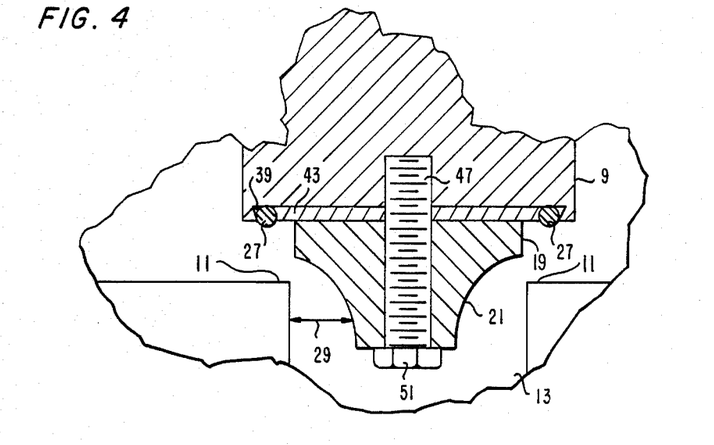
FIG. 4 is a partial sectional view of the piston and associated throttle of the preferred embodiment of tee invention, showing in enlarged detail the embodiment of the invention for controlling the fluid flow area.
Figure 6:
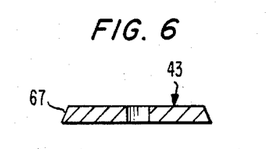
FIG. 6 shows a central sectional view of a tapered-disk "O"-ring retainer of the preferred embodiment of the invention.
Figure 7:
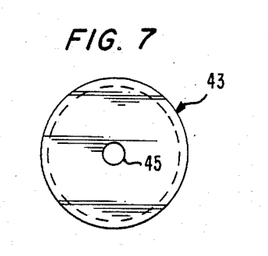
FIG. 7 shows a top view of the tapered disk of FIG. 6.

The present valve system 1 provides a positive shut-off zero leakage valve 1. As previously generally described, the zero leakage piston seal capability is provided by the unique seating design shown in FIG. 4 in detail. The "O"-ring 27 is retained in a groove-like inside perimeter portion 39 of a shallow recessed or cut-out portion 41 in the bottom of the piston 9 (see FIG. 9 for details of the groove-like portion 39 of cut-out 41 of piston 9). The "O"-ring 27 is retained in the groove 69 by a tapered disk 43 (see FIGS. 6 and 7 for sectional and top views, respectively, of the tapered disk 43). This embodiment of the invention provides a substantially perfect seal, in addition to a geometry that is substantially free of erosion caused by fluid flow forces. Note in FIGS. 6 and 7 the hole 45 centrally located through the tapered disk 43. As shown in FIGS. 1 and 4, a threaded stud 47 of a retaining bolt 51 is screwed into a centrally located threaded hole 49 from the bottom of piston 9. The tapered disk 43 is mounted over stud 47 and against the bottom of the cut-out portion or recess 41 of the bottom of piston 9. The throttle 19 is mounted via a centrally located through-hole 49 (see FIGS. 2 and 3) on stud 47, with the upper top portion of throttle 19 flush against the bottom face of the tapered disk 43. The retaining bolt 51 is used to secure the tapered disk 43 and throttle 19 via threaded stud 47 of 51, as indicated. Note also in FIG. 1, that a throughhole or control orifice 53 is provided in the piston 9. This hole 53 is effectively continued via hole 49 and a through-hole 55 through threaded stud 47, as shown. The function of this control orifice 53 is described in detail below.

Another embodiment of the invention is the previously mentioned stepped shape of the piston 9. The piston 9 has an upper portion or section 39, and a relatively narrower lower portion or section 37 (see FIG. 5). The piston step created by these two portions 37, 39 substantially provide the annularly shaped central chamber 5, which as previously described permits fluid to enter the discharge port 13 through the complete 360° of the annular gap provided by the central chamber 5. In this manner, the stability of the valve system 1 is substantially increased via substantial elimination of pressure imbalances, and also provides for a reduction in the overall pressure drop between the inlet port 3 and discharge port 13 of the valve system 1. As previously mentioned, the fluid flow rate is regulated by the position of the piston 9.

With reference to FIG. 1, the position of piston 9 is controlled by balancing the pressure between its discharge side, that is the bottom portions of the upper segment 39 (see FIG. 5), the bottom portions of the lower section 37 relative to fluid in the central chamber 5 (primary discharge side pressure is developed in this chamber 5) and the annular gap 7, respectively, and its top most portion within control cavity 57.

Figure 8:
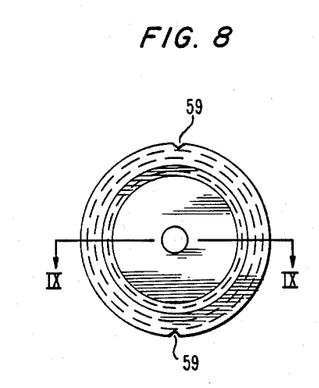
FIG. 8 shows a top view of a preferred embodiment of the invention for the piston.
Figure 9:
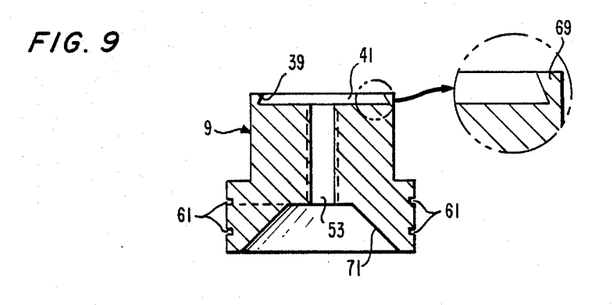
FIG. 9 shows a sectional view of the piston of FIG. 8.

More specifically, fluid flows from inlet port 3 into the central chamber 5, and partly therefrom into the control cavity 57 via vertical slots 59 (see FIG. 8) that run the entire length of the upper section 39 of piston 9. Also as shown in FIGS. 1 and 9, the upper section 39 includes a number of narrow side grooves 61 around the perimeter of the upper section 39, for providing a liquid seal via fluid turbulence.

The plunger 15 includes a sealing tip 63 for providing a fluid-tight seal against the orifice seat 65 of piston 9, when plunger 15 is positioned to force the sealing tip 63 against the orifice seat 65. When such positioning occurs, pressure builds up in the control cavity 57 from fluid therein, and exerts a downward force on the top of piston 9. The area of the top portion of piston 9 exposed to the pressurized fluid in the control cavity is greater than the surface area of the piston exposed to the fluid in the central chamber 5. Since the fluid pressure in the control cavity 57 is equal to the fluid pressure in the central chamber 5, the force exerted on the piston from the control cavity 57 side being equal to the fluid pressure times the area of the piston exposed to the pressure, is greater than and overrides the force exerted from the central chamber 5 side on the bottom portions of the piston. If the plunger 15 is maintained at a position for keeping the sealing tip 63 against the orifice seat 65 of piston 9, via appropriate operation of proportional solenoid 17, the piston 9 will move downward for casing "O"-ring 27 to seat against the valve seat 11, thereby preventing any flow of fluid between the inlet port 3 and discharge port 13.

In opposition to closure of valve system 1, operation of the proportional solenoid 17 for raising the plunger 15 away from the orifice seat 65, will permit fluid from the control cavity 57 to begin to discharge through the control orifice 53 into the discharge port 13. [Note that in this example, the proportional solenoid 17 is a spring-loaded pull-type solenoid 17, which has a fully extended zero power condition.] The flow of fluid from the control cavity 57 through the control orifice 53 causes the pressure in the control cavity 57 to decrease, thereby decreasing the force exerted on the top of the piston 9. Assuming that proportional solenoid 17 is operated for continuing retraction of plunger 15 into the solenoid 17, the force exerted upon the top of the piston 9 will continue to decrease until it is less than that of the force exerted on the bottom portions of the piston from the pressurized fluid in the central chamber 5. When the pressure forces upon piston 9 are so reversed, piston 9 will then begin to move upward, causing "O"-ring 27 to unseat from valve seat 11, thereby permitting the initiation of fluid flow from the central chamber 5, through the annular gap 7, and into the discharge port 13. Assuming that the plunger 15 is retracted to a given position, and held at this position, the piston 9 will continue to move upward away from valve seat 11 until the orifice seat 65 closes against the sealing tip 63. When this occurs, pressure will gain build up in the control cavity 57, as previously described, until the force exerted against the top of the piston 9 is in equilibrium with the force exerted against the bottom portion of the piston via fluid pressure in central chamber 5. At this point, the position of piston 9, and as a result also the flow rate, stabilize such that the remaining discharge flow through the control orifice 53 equals the flow of fluid from the inlet port 3 to the control cavity 57 via the vertical slots 59 in the side of the upper portion 39 of piston 9. At this point, the sealing tip 63 has not sealed off the orifice seat 65, but is at a distance therefrom that permits such equilibrium of flow of fluid.

Operation of the present valve system 1 is predicated upon the incorporation of the control orifice 53 through the piston 9, as previously described. This configuration, in effect, forces the piston 9 to follow the plunger 15. In other words, any movement of the piston 9 away from the plunger 15 affects the control orifice discharge rate, which creates a pressure imbalance for causing the piston 9 to move back toward the plunger 15 until an equilibrium condition is reached, as previously described.

As described above, the operation of the valve system 1 utilizes fluid pressure to position the piston 9 for establishing a desired flow rate of fluid. The plunger 15, positioned by operation of proportional solenoid 17, provides balancing of the forces upon the piston via fluid pressure, for controlling the flow rate of fluid between the inlet port 3 and discharge port 13. As a result, the proportional solenoid 17 need only produce forces for moving plunger 15 that are low relative to the fluid forces produced within the valve system 1. Also, since the proportional solenoid 17 is spring loaded, if power is suddenly disrupted form the proportional solenoid 17, the spring (not shown) therein will cause plunger 15 to extend for pushing sealing tip 63 against the orifice seat 65, for causing the valve system 1 to shut off the flow of fluid, as previously described. As a result, the present invention provides the positive feature of fail-close valving.

Other embodiments of the invention will now be described. As shown in FIG. 4, the tapered disk 43 is used to retain the "O"-ring 27 captive within the groove formed between the end or peripheral side portion 67 (see FIG. 6) of disk 43, and the inside perimeter portion of cut-out 41 (see FIG. 9) in the bottom of piston 9, as previously generally described. Note in FIG. 9 the exploded detail of the semicircular end portion 69 about the outer perimeter of the walls forming the cut-out portion 41. The tapered disk 43 forces the "O"-ring 27 captively against the semicircular peripheral groove 69, in this preferred embodiment of the invention.

The top of piston 9, that is the control cavity 57 side thereof, has sides 71 which slope downward towards the orifice seat 65, thereby forming a conical cavity 73 within the top of piston 9. This embodiment of the invention facilitates the elimination of air from control cavity 57, by forcing the air to move downward and into the control orifice 53. Air elimination in this manner is most efficient when the valve system 1 is oriented for positioning the discharge port 13 facing upward (180° opposite to the position shown in FIG. 1). It is believed that such orientation of the valve system 1 will be practical in most applications for the valve system 1.

Figure 10:
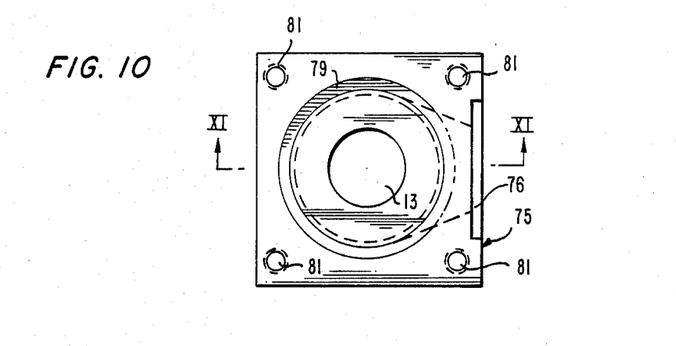
FIG. 10 shows a top view of the valve body of a preferred embodiment of the invention.
Figure 11:
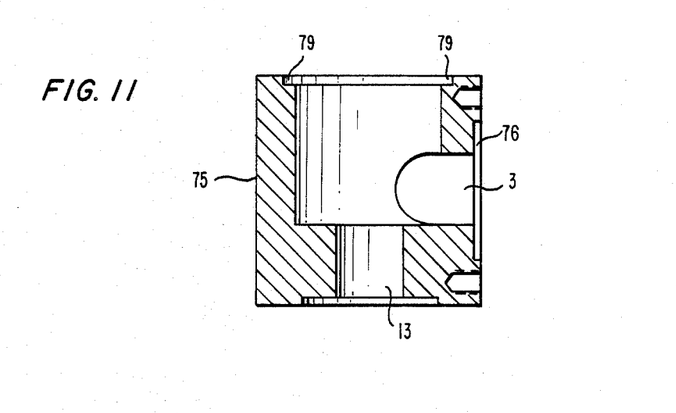
FIG. 11 shows a sectional view of the valve body of FIG. 10.
Figure 12:
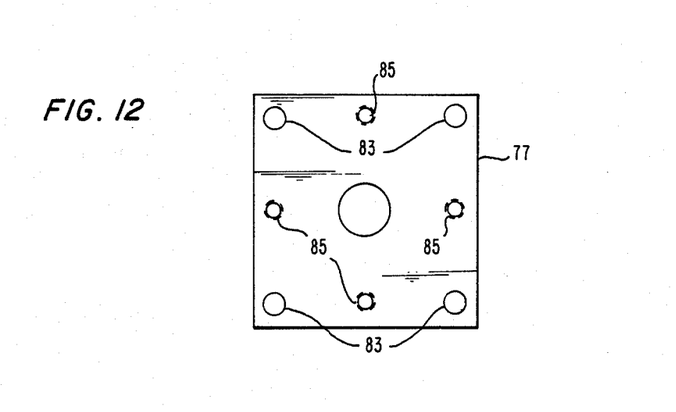
FIG. 12 shows a top view of a valve cover of a preferred embodiment of the invention.

The body of the valve system 1 is generally shown in FIG. 1, and more particularly shown in the top and sectional views of FIGS. 10 and 11, respectively. The groove 79 located in the top of the valve body 75 is for receiving an "O"-ring (not shown), for providing a fluid-type seal between the valve body 75 and a valve cover 77 (see FIG. 12). Four tapped holes 81 are located in the to of the valve body 75 for receiving bolts inserted through holes 83 in the valve cover 77, for securing the valve cover 77 to the top of the top of the valve body 75. Also, the valve cover 77 includes four threaded holes 85 for securing the proportional solenoid 17 via bolts 87 (see FIG. 1) to the valve cover 77. Note also that bolts 89 are used to secure the valve cover 77 to the top of the valve body 75 (see also FIG. 1).

Figure 13:
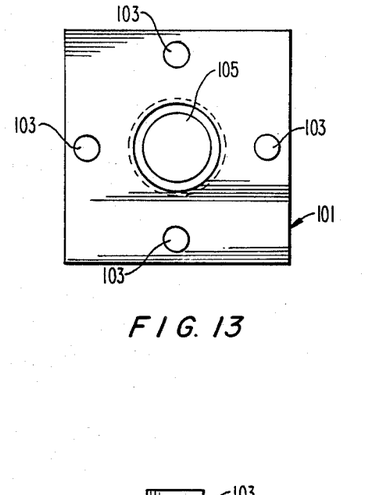
FIG. 13 shows a front view of an inlet flange for mounting onto the right side of the valve body of FIG. 11.
Figure 14:
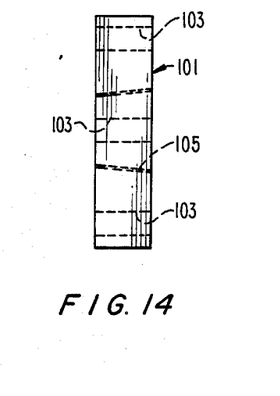
FIG. 14 shows a left side view of the inlet flange of FIG. 13.
Figure 15:
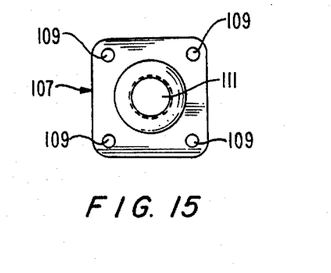
FIGS. 15 and 16 are front and edge views of an outlet flange for mounting to the bottom of the valve body of FIG. 11.
Figure 16:
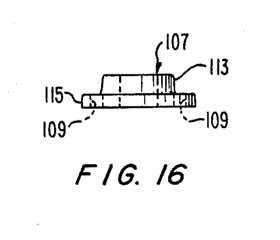

With reference to FIG. 13, an inlet flange 101 is provided for mounting onto the right side of valve body 75 (see FIG. 11) via bolts (not shown) inserted through bolt holes 103, for mating with threaded holes 74 in valve body 75. As shown in the left side view of the flange 101, a tapered threaded hole 105 is provided for accepting a threaded pipe. Similarly, FIGS. 15 and 16 show front and edge views of an outlet flange 107 for mounting to the bottom of the valve body 75 of FIG. 11 via bolts (not shown) inserted through bolt holes 109 into appropriately located threaded holes (not shown) of the valve body 75. A threaded hole 111 for receiving a threaded pipe is provided at the center of flange 107, as shown.

Although various embodiments of the invention have been shown and described for purposes of illustration thereof, such description is not meant to ee limiting, and variations of these embodiments that may occur to one skilled in the art are also meant to be within the spirit and scope of the invention as claimed herein.

We claim:

1. In a valve system, the combination comprising:
 a cylindrical valve body including a side wall, an inlet port through a portion of said side wall, a bottom with a centrally located discharge port, and an interior chamber;
 a valve cover secured to the top perimeter surface of said side wall of said valve body, a hole being centrally located through said valve cover;
 a proportional solenoid rigidly attached to the top of said valve cover over said hole, responsive to the magnitude of a control signal for positioning a plunger through said hole at a desired location within said interior chamber;
 a piston slideably positioned within said interior chamber, said piston including a conically shaped hollowed out top portion, a centrally located through hole providing a control orifice, a raised boss-like portion concentric with said orifice hole for providing an orifice seat, said conically shaped portion serving to direct air entrapped in liquid in a control cavity formed above the top of said piston into said control orifice, said piston having an upper section including its top portion of substantial outside diameter, and a lower section of relatively less outside diameter concentric with said upper section;
 a throttle rigidly attached to and concentric with the bottom of said lower section of said piston, said throttle having a through hole for continuing said control orifice, the upper portion of said throttle being cylindrical and having an outside diameter approaching the inside diameter of said discharge port, the lower portion of said throttle including a plurality of scalloped regions;
 said lower section of said piston having a recessed portion in the bottom thereof;
 an O-ring located in the perimeter of said recessed portion of said lower section of said piston;
 a tapered disk located in said recessed portion between said throttle and said piston for retaining said 0-ring in said recessed portion;
 said piston further including vertical slots in the upper section of said piston for permitting fluid to flow from a central chamber formed between the side walls of said lower section and inside wall of said valve body to said control cavity, and side grooves around the circumference of said upper section for creating turbulence in said fluid for providing a liquid seal;
 said plunger having a sealing tip on its end, and being positionable for forcing said sealing tip against said orifice seat for causing the pressure in said control cavity to create a greater force against the top of said piston, than the force from the pressurized fluid in said central chamber, for moving the piston downward toward a valve seat formed about said discharge port below said 0-ring, tending to controllably decrease the flow rate, whereas when said plunger is moved away from said orifice seat, fluid flows from said control cavity through said control orifice into said discharge port, causing an opposite pressure imbalance for moving the piston upward away from said valve seat, thereby further opening said valve.

2. A fluid flow control valve comprising:
 a valve body including a top end portion, a plurality of side portions, and a bottom end portion, an inlet port through one of said side portions, and a discharge port centrally located through one of said end portions for providing the rectilinear discharge of fluid from said valve;

a piston slideably retained with an interior chamber of said valve body, said piston including first and second concentric portions, said first portion having a substantially larger diameter than said second portion, said first portion having a face opposing the other end portion of said valve body with the space therebetween forming a control cavity, said face being hollowed out and conically shaped, a centrally located through hole providing a control orifice through said first and second portions, said second portion having a face concentric with and opposing said discharge port, a central chamber being formed in the space between an interior wall of said valve body and said second portion, said central chamber receiving fluid from said inlet port, said conically shaped face of said first portion serving to direct air entrapped in fluid in said control cavity into and through said control orifice to said discharge port;

said piston further including at least one axially aligned slot in said first portion of said piston, for permitting fluid to flow from said central chamber to said control cavity;

sealing means attached to the face of said second portion of said piston for providing a water tight seal between said discharge port and said central chamber whenever said piston is positioned for turnoff of said valve; and control means for selectively either sealing off said control orifice for causing said piston to move towards said discharge port for successively decreasing the flow rate of fluid between said inlet port and said discharge port, or opening said control orifice to permit the flow of fluid from said control cavity via said control orifice to said discharge port for causing said piston to move away from said discharge port for successively increasing the flow rate of fluid through said valve.

3. The fluid flow control valve of claim 2, wherein said piston further includes means for creating turbulence in the fluid between the sides of said first portion of said piston, and opposing inside walls of said valve body, for creating a fluid seal and bearing therebetween whenever relative movement between said piston and said fluid exists.

4. The fluid flow control valve of claim 3, wherein said turbulence means includes at least one relatively small circumferential groove in said first portion of said piston.

5. The fluid flow control valve of claim 2, wherein said control means includes:

plunger means selectively positionable within said control cavity for either in a first mode initially sealing off said control orifice and pushing said piston toward said discharge port either until an equilibrium of fluid flow between said control cavity and central chamber is attained for maintaining the position of said piston for a desired flow rate of fluid, or until said sealing means is pushed against said discharge port for turning off said valve, or in a second mode moving away from said control orifice, for permitting said piston to move away from said discharge port to a position where said plunger is a distance from said control orifice, for attaining equilibrium of fluid flow between said control cavity and said central chamber, thereby maintaining said piston at a position providing a desired flow rate of said fluid.

6. The fluid flow control valve of claim 5, wherein said plunger means includes a sealing tip on its one end, and said piston further includes a raised boss-like portion concentric with said orifice hole for providing an orifice seat for forming a fluid tight seal with the sealing tip of said plunger means.

7. The fluid flow control valve of claim 5, wherein said control means further includes proportional solenoid means rigidly mounted to the other end of said valve body above said piston, and connected to said plunger means, for positioning the latter in response to a control signal for selecting a desired flow rate of fluid between said inlet and discharge ports.

8. The fluid flow control valve of claim 2, wherein said sealing means includes:

a recessed area in the face of said second portion of said piston, said recessed area being concentric with said control orifice hole;

an O-ring located in the perimeter of said recessed area; and a tapered disk secured within said recessed area for retaining said O-ring between a tapered circumference of said disk and an oppositely tapered circumferential wall of said recessed area.

9. The fluid flow control valve of claim 8, further including throttle means secured to the face of said second portion of said piston with said tapered disk therebetween, for (1) providing a controlled variable annular gap between said discharge port and said piston for substantially eliminating "spiking" in the rate of fluid flow that may cause piston jump upon either opening or closing of said valve, and (2) providing smooth changes in the rate of fluid flow via movement of said piston.

10. The fluid flow control valve of claim 9, wherein said throttle means includes a through hole for continuing said control orifice, an upper cylindrical section abutting said tapered disk, said upper cylindrical section having an outside diameter approaching the inside diameter of said discharge port, and a lower section including a plurality of scalloped regions.

11. The fluid flow control valve of claim 8, further including throttle means secured to the face of said second portion of said piston, for (1) providing a controlled variable annular gap between said discharge port and said piston for substantially eliminating "spiking" in the rate of fluid flow that may cause piston jump upon either opening or closing of said valve, and (2) providing smooth changes in the rate of fluid flow via movement of said piston.

12. The fluid flow control valve of claim 11, wherein said throttle means includes a through hole for continuing said control orifice, an upper cylindrical section abutting said tapered disk, said upper cylindrical section having an outside diameter approaching the inside diameter of said discharge port, and a lower section including a plurality of scalloped regions.

13. The fluid flow control valve of claim 2, wherein said valve body and said piston are each cylindrical.

14. A fluid flow control valve comprising:

a valve body including a side wall, an inlet port through a portion of said side wall, a top, a bottom, a discharge port centrally located in the bottom, and an interior chamber;

a piston slideably mounted with said interior chamber, said piston having one end overlappingly opposing and concentric with said discharge port, said one end having a recessed portion;

said piston further including first and second concentric cylindrical sections, said first section being of substantially greater diameter than said second section, the face of the latter being said one end of said piston, a centrally located hole through said first and second sections forming a control orifice, the volume of the space between the face of said first section and the interior of said valve body forming a control cavity, the volume of space between the face of said second section and the interior of said valve body forming a central chamber, said piston further including means for permitting fluid to flow from said central chamber to said control cavity;

an O-ring located in the perimeter of said recessed portion of said one and of said piston;

a disk having a tapered circumference, said disk being removeably attached to, concentric with, and located within said recessed portion of said one end of said piston, the diameter of said disk being dimensioned for causing the tapered circumference of said disk to captively retain the O-ring within said recessed portion, in a manner permitting a portion of said O-ring to extend beyond said disk away from said piston;

means for selectively positioning said piston within said valve body for controlling the rate of fluid flow between said inlet and discharge ports, whereby closure of said valve is obtained whenever said piston is positioned for forcing said O-ring against a valve seat located proximate said discharge port;

said positioning means including means for selectively blocking the flow of fluid from said control cavity through said control orifice to said discharge port, for moving said piston toward said discharge port, and for at other times permitting such flow of fluid of a magnitude for either moving said piston away from said discharge port or for maintaining said piston at a position providing a desired flow rate of fluid;

said inlet port being positioned for providing fluid flow into said central chamber; and said blocking means of said positioning means including a proportional solenoid rigidly attached to the top of said valve body, and a plunger located within said valve body, said plunger having one end connected to said solenoid, and another end for selectively blocking said control orifice, whereby said solenoid is responsive to a control signal for positioning said plunger to move and retain said piston at a position thereof providing a desired flow rate of said fluid.

15. The fluid flow control valve of claim 14, further including the wall of the recessed portion of said one end of said piston being tapered oppositely to the tapered circumference of said disk for retaining a portion of said O-ring therebetween in a positive manner without distortion of the latter.

16. The fluid flow control valve of claim 14, wherein the face of said first section of said piston is hollowed out and conical in shape.

17. A fluid flow control valve comprising:

a valve body including a side wall, an inlet port through a portion of said side wall, a top, a bottom, a discharge port centrally located in the bottom, and an interior chamber;

a piston slideably mounted within said interior chamber, said piston having one end overlappingly opposing and concentric with said discharge port, said one end having a centrally located recessed portion;

sealing means removably secured to, located within, and concentric with said recessed portion of said one end of said piston for providing a fluid tight seal between said piston and a valve seat about the circumference of said discharge port whenever said piston is positioned for closure of said valve;

a throttle rigidly attached to and concentric with a portion of said sealing means, the upper portion of said throttle proximate said piston being cylindrical and having an outside diameter approaching the inside diameter of said discharge port, the lower portion of said throttle including a plurality of scalloped regions; and positioning means for selectively positioning said piston within said valve body, for obtaining a desired fluid flow rate.

18. The fluid flow control valve of claim 17, further including:

said piston including first and second concentric cylindrical sections, said first section being of substantially greater diameter than said second section, the face of the latter being said one end of said piston, a centrally located hole through said first and second sections forming a control orifice, the volume of the space between the face of said first section and the interior of said valve body forming a control cavity, the volume of space between the face of said second section and the interior of said valve body forming a central chamber;

said piston further including means for permitting fluid to flow from said central chamber to said control cavity;

said positioning means including means for selectively blocking the flow of fluid from said control cavity through said control orifice to said discharge port, for moving said piston toward said discharge port, and for at other times permitting such flow of fluid of a magnitude for either moving said piston away from said discharge port or for maintaining said piston at a position providing a desired flow rate of fluid; and said inlet port being positioned for providing fluid flow into said central chamber.

19. The fluid flow control valve of claim 18, wherein said blocking mean of said positioning means includes:

a proportional solenoid rigidly attached to the top of said valve body;

a plunger located within said valve body, said plunger having one end connected to said solenoid, and another end for selectively blocking said control orifice, whereby said solenoid is responsive to a control signal for positioning said plunger to both move said piston to, and retain said piston at, a position thereof providing a desired flow rate of said fluid.

20. The fluid flow control valve of claim 19, wherein the face of said first section of said piston is hollowed out and conical in shape.

21. The fluid flow control valve of claim 17, wherein said sealing means includes:
a recessed area in the face of said second section of said piston, said recessed area being concentric with said control orifice hole;
an O-ring located in the perimeter of said recessed area; and
a tapered disk secured within said recessed area for retaining said O-ring between a tapered circumference of said disk and an oppositely tapered circumferential wall of said recessed area.

* * * * *

UNITED STATES PATENT AND TRADEMARK OFFICE
CERTIFICATE OF CORRECTION

PATENT NO. : 4,793,589

DATED : December 27, 1988

INVENTOR(S) : David S. Eldredge; Dolan F. Blalock; and John S. McSpadden

It is certified that error appears in the above-identified patent and that said Letters Patent is hereby corrected as shown below:

Column 2, line 44, "inproved" should be --improved--, line 51, the first appearing "a" should be --,--, and "The" should be --the--. Column 3, line 7, "tee" should be --the--. Column 7, line 64, "ee" should be --be--.

Column 9, Claim 2, line 4, "with" should read -- within --.

Signed and Sealed this

Ninth Day of May, 1989

Attest:

DONALD J. QUIGG

*Attesting Officer*

*Commissioner of Patents and Trademarks*